United States Patent [19]

Kojima

[11] Patent Number: 4,508,328
[45] Date of Patent: Apr. 2, 1985

[54] VICE FOR FISHHOOK

[75] Inventor: Satoru Kojima, Nagano, Japan

[73] Assignees: Coret & Company, Ltd.; Machine Engineering Co., Ltd., both of Japan

[21] Appl. No.: 608,822

[22] Filed: May 10, 1984

[51] Int. Cl.³ .............................................. B25B 1/08
[52] U.S. Cl. .................................... 269/236; 269/907
[58] Field of Search .................... 269/71, 6, 236, 907; 81/6, 7, 8

[56] References Cited

U.S. PATENT DOCUMENTS

| | | | |
|---|---|---|---|
| 2,530,713 | 11/1950 | Martinez | 269/236 |
| 2,586,636 | 2/1952 | Fischer et al. | 269/71 |
| 3,945,631 | 3/1976 | Sander | 269/236 |
| 4,039,178 | 8/1977 | Odames | 269/236 |
| 4,094,497 | 6/1978 | Stratton | 269/71 |

*Primary Examiner*—Robert C. Watson
*Attorney, Agent, or Firm*—Sughrue, Mion, Zinn, Macpeak, and Seas

[57] ABSTRACT

A vice for a fishhook including a cam, a main body, a pair of jaws defining a chuck at the front ends thereof, an operating lever fixed integrally with a cam, and an adjusting screw threadedly engaged with the main body and having a forward end in abutment with the cam for adjusting the force provided by the jaws on a fishhook engaged by the vice. Each jaw has a tapered portion, and the jaws are positioned opposite one another to define a space therebetween at rear ends thereof. The cam and a portion of the main body are received in the space. The cam and operating lever are rotatable around a shaft which passes through the jaws and the cam. A spring is provided between the jaws and the main body for urging the adjusting screw into abutment with the cam. Cam surfaces formed integrally with the main body are provided for varying the distance between the abutting tapered surfaces of the chuck formed at the front end of the pair of jaws.

5 Claims, 3 Drawing Figures

VICE FOR FISHHOOK

BACKGROUND OF THE INVENTION

The present invention relates to a vice used in preparing flies for flyfishing.

Flies used for flyfishing are of course currently sold on the market. Notwithstanding, many anglers prefer to make their own original flies by tying fur, feathers and the like around a hook. To this end, a jig is required to lock or clamp the tip of the hook. Various vices have been developed for such a jig.

The conventional vice, however, involves various drawbacks including the facts that forces exerted on the hook cause the hook to be deflected according to the thickness of the hook, and that the overall arrangement is complicated and expensive.

SUMMARY OF THE INVENTION

Overcoming the above and other drawbacks, the invention provides a fishhook vice including a screw for adjusting the vice to accommodate hooks of various thickness for ensuring positive and firm clamping of hooks of all sizes. A rotary lever system is employed to make operations with the device simple and the device compact.

More specifically, the above and other objects of invention are met by providing a vice for a fishhook comprising a pair of jaws defining chuck means at the front ends thereof, each having a tapered surface portion. The jaws are positioned opposite one another to form a space defined at the rear ends thereof, the space having a cam and a portion of a main body received therein. A shaft forming the axis of rotation of the cam is fitted into the jaws and cam. An operating lever is fixed integrally with the cam. An adjusting screw is mounted on the main body to move the main body toward and away from the operating lever and cam. A spring is provided between the pair of jaws and the main body for urging the adjusting screw into abutment with the cam. The main body is formed with cam means to vary the distance between the tapered surface portion and the abutting chuck means. A cover formed integrally with the main body or the pair of jaws encases at least the cam means and the pair of jaws.

DESCRIPTION OF THE PREFERRED EMBODIMENTS

A preferred embodiment of the invention will now be discussed with reference of the accompanying drawings.

Figure 2:
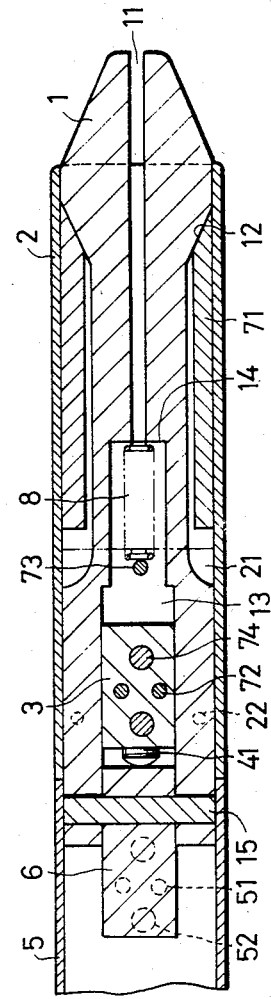
FIG. 2 shows a horizontal section of the embodiment of FIG. 1.
Figure 3:
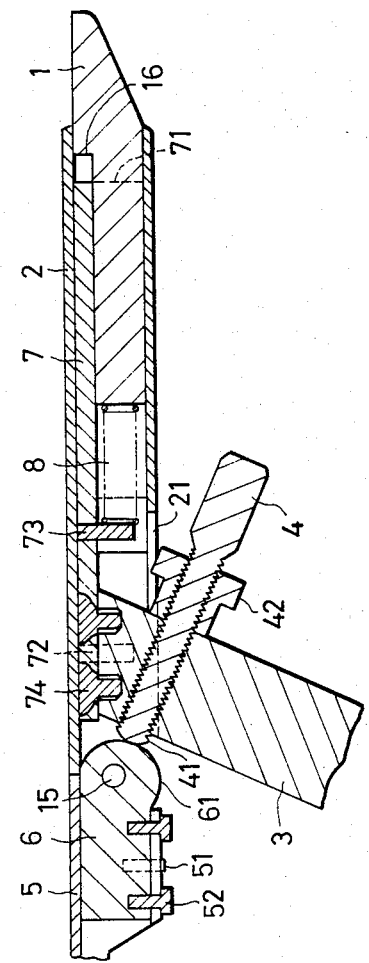
FIG. 3 shows a vertical section of the embodiment of FIG. 1.

A tubular main body 7 is positioned by pins 72 and then secured by screws 74 to a support 3. The main body 7 is provided with cam surfaces 71, between which a pair of jaws 1 are disposed. The jaws are formed on the tops thereof with notches 16 to engage the main body 7 therein. The main body 7 is dimensioned as shown in FIG. 3 to provide a rectangle whose width corresponds to that of a space defined by opposed covers 2, as shown in FIG. 2. Each of the notches 16 is dimensioned to permit the jaws to move with respect to the main body 7 (FIG. 3).

The jaws 1 include a chuck portion 11, a tapered portion 12, an interior space 13, stepped portions 14, and a shaft 15 which is force fitted into the jaws. The shaft 15 carries a cam 6 rotatably mounted thereon in the space 13 serving as the axis of rotation of the cam 6. The cam 6 is affixed via pins 51 and screws 52 to an operating lever 5.

Figure 1:
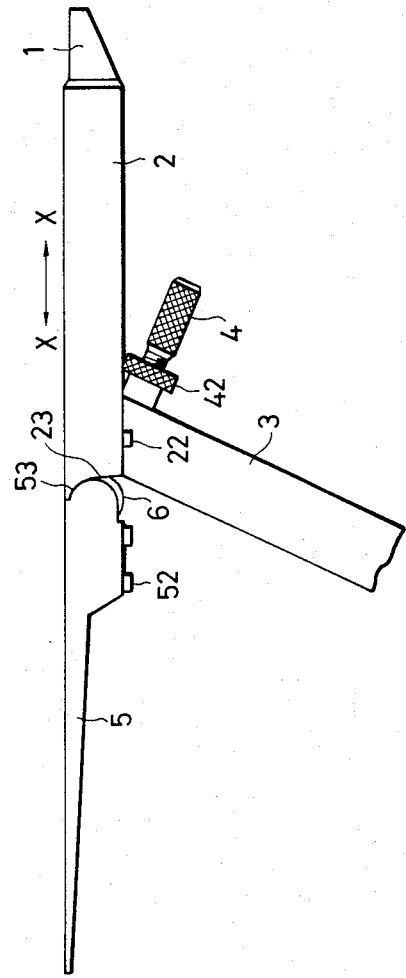
FIG. 1 is a side view of a preferred embodiment of a fishhook vice of the invention.

The support 3 is fitted within the space 13 and provided with an adjusting screw 4 which is threaded into the support 4 for movement toward and away therefrom. One end of the screw 4 abuts against the cam 6. The force at this abutment depends upon the bias force of a compressive coil spring 8 extending between the stepped portions 14 and a pin 73 rigidly mounted on the main body. The cam 6 has an arcuate crown 61 of large diameter in the neighborhood of its axis of rotation so that the lever 5 is caused to stably stop in a first position as shown in FIG. 1 and in a second position (in which the crown 61 abuts against the screw end 41) where the lever 5 is close to the support 3. The lever when in the first position opens the chuck portion 11, and when in the second position closes the chuck portion 11.

The pair of covers 2 of cylindrical form encases the jaws 1, the main body 7, and the cam surfaces 71. The covers 2 are rigidly mounted by a screw 22 on the jaws. Reference numerals 23 and 53 indicate arcs defined by the covers 2 and the operating lever 5, respectively, centered around the shaft 15. Thus, the covers 2 are fixedly positioned with respect to the shaft 15, even when the lever 5 is rotated.

The jaws 1, covers 2, and the lever 5 and the like are supported with respect to the support 3 for movement in the direction X—X indicated in FIG. 1 so that they are positioned depending upon the position of abutment of the screw 4 with the cam 6, thereby to set the degree of opening of the chuck portion 11 since the cam 6 is fixed in position.

The mode of operation of the vice of the invention will now be explained. A hook (not shown) is placed in the chuck portion 11 while in the open condition. The lever 5 is counterclockwise rotated toward the support 3 to thus change the contact point of the cam 6 with the screw 4, that is, to increase the radius of the cam 6. This action retracts the shaft 15 from the main body, and hence retracts the lever 5, covers 2, and the jaws 1 until the tapered portions 12 of the jaws 12 are in sliding contact with the cam surfaces 71. As a result, the chuck portions are closed to firmly clamp the hook. The clamping force is a maximum when the crown 61 of the cam 6 abuts against the screw end 41. The lever can be rotated through an angle of 60° to 70° until the screw end is slightly beyond the crown 61. The lever can then be rotated no further. In this connection it is noted that the clamping force is substantially constant since the crown has a substantially constant diameter and a larger top.

In general, hooks come in various thicknesses. The adjusting screw 4 can be set so as to accommodate such hooks. For accommodation of a particular hook, if the clamping force is too weak when the vice is closed, a nut 42 is loosened to allow the screw 4 to be advanced, whereas if clamping force is too strong, the screw 4 is retracted. Once the adjustment of the screw 4 has been effected, the nut 42 is tightened.

In short, the instant vice attains an excellent operability, providing a stable force by adjusting the screw 4 to thus render substantially fixed the position where the lever 5 is open or closed.

In the embodiment shown, the jaws when extended are maintained substantially parallel to provide a substantially constant clamping force, irrespective of the thickness of the hook.

The invention is not limited to the precise forms and embodiment described. For example, the objects of the invention may be achieved by an arrangement wherein the shaft 15 is fixed to the cam but adapted for rotation with respect to the jaws, the shaft is rotated with respect to the both jaws and cam, the covers are fixed to the main body or the covers are replaced with a modified main body which functions as covers to embrace the jaws, the two jaws are integrated at the intermediate portions thereof, the jaws are made somewhat elastic at the intermediate portions to absorb any overload and to maintain the chuck surfaces parallel, and the diameter of the crown 61 is made constant.

I claim:

1. A vice for a fishhook comprising:
   a cam;
   a main body;
   a pair of jaws defining chuck means at front ends thereof, each jaw having a tapered portion, said jaws being positioned opposite one another to form a space therebetween at rear ends thereof, said space having said cam and a portion of said main body received therein;
   a shaft at an axis of rotation of said cam passing through said jaws and said cam;
   an operating lever integral with said cam, said cam and said lever being rotatable around said shaft;
   an adjusting screw threadedly engaged with said main body and having a forward end in abutment with said cam;
   a spring provided between said pair of jaws and said main body for urging said adjusting screw into abutment with said cam;
   cam means integral with said main body for varying a distance between abutting tapered surfaces of said chuck means; and
   a cover for encasing at least said cam means and portions of said pair of jaws.

2. The vice of claim 1, wherein said main body comprises:
   a jaws-accommodating portion and a handle portion, said jaws-accommodating portion extending parallel to said pair of jaws, said chuck means of said jaws protruding from a forward end of said jaws-accommodating portion, said operating lever extending rearwardly from a rear end of said jaws-accommodating portion; and
   a handle portion extending downwardly from said jaws-accommodating portion, said adjusting screw being threadedly engaged with said handle portion at a position below said jaws-accommodating portion.

3. The vice of claim 1, wherein said handle portion forms an obtuse angle with said jaws-accommodating portion.

4. The vice of claim 3, further comprising a retaining nut for fixing a position of said screw.

5. The vice of claim 4, further comprising a pin rigidly affixed to said jaws-accommodating portion of said main body, one end of said spring being in abutment with said pin and a front end of said spring being in abutment with said pair of jaws.

* * * * *